United States Patent [19]
Liebrecht, Jr.

[11] Patent Number: 5,113,610
[45] Date of Patent: May 19, 1992

[54] ROTATING DISK TYPE DITCHER

[76] Inventor: Sylvester Liebrecht, Jr., Rte. #2, 17771, Continental, Ohio 45831

[21] Appl. No.: 785,533

[22] Filed: Oct. 31, 1991

[51] Int. Cl.⁵ .............................................. E02F 5/08
[52] U.S. Cl. ........................................ 37/94; 37/91; 37/189; 37/191 R; 37/195
[58] Field of Search ................. 37/91, 92, 94, 189, 37/191 R, 195, 85, 86

[56] References Cited

U.S. PATENT DOCUMENTS

| | | | |
|---|---|---|---|
| 2,347,378 | 4/1944 | Swank | 37/91 |
| 2,788,726 | 4/1957 | Keyes | 37/91 |
| 2,885,800 | 5/1959 | Hawkins | 37/91 |
| 3,683,522 | 8/1972 | Rousseau et al. | 37/189 X |
| 3,708,232 | 1/1973 | Walsh | 356/172 |
| 3,813,171 | 5/1974 | Teach et al. | 356/152 |
| 3,994,083 | 11/1976 | Cunningham | 37/80 R |
| 4,162,708 | 7/1979 | Johnson | 172/4.5 |
| 4,454,767 | 7/1984 | Cartner | 37/81 |
| 4,506,464 | 3/1985 | Cartner | 37/91 |
| 4,682,427 | 7/1987 | Dondi | 37/91 |
| 4,912,643 | 3/1990 | Beirxe | 364/449 |
| 5,027,534 | 7/1991 | Sackett | 37/91 |

OTHER PUBLICATIONS

Publication Agricultural Engineering, Aug. 1971, pp. 418, 419, "The Laserplane System", by David C. Studebaker.

Primary Examiner—Dennis L. Taylor
Assistant Examiner—J. Russell McBee
Attorney, Agent, or Firm—Charles F. Schroeder

[57] ABSTRACT

A method and apparatus in which a laser controllable ditcher drawn by a tractor to which it is attached for forming ditches, furrows and the like incorporates a cutting disk which is adjustably inclined downwardly toward the rear of its direction of travel such that its under face forms an acute angle with the ground beneath so that its leading edge cuts into the ground. The disk is driven rotationally through a speed reducer by a driveshaft extending to the ditcher from the tractor. The disk has spaced cutters at its edge which dig into the soil and cause the soil to be lifted into the path of movement of paddles or scoops on the back side of the disk which in effect throw the soil particles a considerable distance to one side of the tractor path. The distance of throw is established by the depth of cut and is assisted by an adjustable inclination or lift of the upward moving side of the disk in rotation to produce the desired trajectory for throwing the soil a distance to one side such that upon subsequent passes of the ditcher the soil is not required to be picked up again and redistributed.

24 Claims, 3 Drawing Sheets

ROTATING DISK TYPE DITCHER

FIELD OF THE INVENTION

The present invention is a method and apparatus described herein as represented by a ditch forming machine or "ditcher" adapted to be drawn by a tractor. The ditcher has a relatively large single disk or disk cutter inclined downwardly toward the rear of the line of travel of the ditcher for an effective soil cutting action The disk is also inclined laterally to one side of the line of travel toward the direction of throw to effectively increase the trajectory of the soil and correspondingly to appreciably increase the distance of throwing of cut soil to one side of its path of travel of the ditcher such as when it moves through a field.

The ditcher of the present invention, also termed a disk ditcher, lends itself admirably to laser controlled formation of drainage depressions such as ditches, furrows and swales in farm crop land for drainage of excess rain water which might otherwise accumulate and cause damage to growing crops. In this regard systems for removal of water have been developed wherein drainage depressions in the form of furrows or ditches have been cut through fields at distances of 300 feet or so apart for drainage of water from the areas of soil inbetween and conveyance of such excesses to main ditches or adjacent rivers or other bodies of water. These drainage depressions are often fairly wide, in the range of 30 feet or so wide, but relatively shallow in the order of one foot or so in depth. Thus when crops are planted inbetween depressions or paths, they can be planted directly in the drainage depressions or paths as well.

The exactness of grade of such drainage paths is important, especially in view of their relative shallowness. According to the present invention a ditcher is described and claimed which is particularly adapted to close regulation in height by a conventional laser beam system to establish a pre-selected grade in forming drainage paths extending over considerable length providing drainage for appreciably large acreages.

In the arrangement herein described, a rotating laser beam of commercial type having grade selection capabilities provides a reference plane defined by the rotating beam inclined at the grade selected. Such an arrangement is described in an article entitled "The Laserplane System" published in "Agricultural Engineering" August 1971, Pages 418 and 419. A receiver on the tractor-drawn ditcher senses and adjusts the height of cut of the disk with each pulse of the laser beam sensed. Thus as the tractor draws the ditcher through the field the disk depth of cut is continually adjusted to establish the selected cut necessary at each increment of length to establish the grade desired in the drainage path. Such a laser beam, for example, may be rotated at 600 RPM and thus send six pulses per second to the receiver to make an adjustment during each instant and each increment of movement of the ditcher through a field.

The depth of cut of the ditcher through the field is selected by the operator as determined by on site trial of soil conditions. The width and depth of the drainage path desired then determines the number of passes necessary for the ditcher to form the path. A number of side-by-side passes can be made as well as a number of passes over each other to establish the width and depth of the desired final drainage path. The laser beam sensor system provides signals to regulate the hydraulic control on the tractor to make the continual adjustments in the force exerted by the tractor hydraulics on the disk support mechanism. An adjustment for the depth of cut necessary for the present grade is thus made at each increment of travel of the ditcher through the field in which a drainage path is being formed regardless of terrain changes encountered.

SUMMARY OF THE INVENTION

The ditcher cutting disk is inclined downwardly with its under face forming an acute angle with the ground beneath and is driven rotationally through a speed reducer by a driveshaft extending to the ditcher from the tractor which pulls it. The disk is provided with spaced cutters at its edge which dig thin slices of soil from the ground in which the drainage path is being formed and causes it to be lifted into the path of movement of paddles or scoops on the back side of the disk which collect and in effect throw the soil particles a considerable distance to one side of the tractor path. The distance of throw is established by the depth of cut and laterally inclined orientation of the disk to produce the desired tossing of the soil a distance to one side of the desired drainage path. The soil is desirably thrown sufficiently to one side of the path of travel of the ditcher such that upon subsequent passes the soil is not required to be picked up again and redistributed.

The spaced cutter members or blades project from the circumferential edge of the disk. In operation, the disk, because of its relatively low angular orientation to the horizontal, extending from its leading edge away from the direction of travel, acts to bite into the soil in which the ditch is being formed. As the disk rotates, the cutters projecting from its edge cut into and under the surface of the soil as the disk is drawn forward. Scoops or paddle-like projections on the top side of the disk gather the newly cut soil and conveys it circumferentially upward on the disk whereupon it is flung radially outwardly in a direction lateral to the path of travel of the tractor and ditcher The disk may also be tilted laterally so that its under surface faces the direction of throw. This lateral angular orientation can be preselected to assist in establishing a trajectory for an appreciable distance of throw of the soil to one side of the path of travel of the tractor and ditcher. Thus upon subsequent passes of the ditcher in close adjacent paths to form a wider drainage channel, the soil which has been thrown is not required to be again picked up in forming a wider channel.

The framework for holding the disk and its reduction drive is attached to the back of a tractor in pivoted relation in a lower region by way of laterally spaced link members. The top of the framework is connected to a third link member connected by way of a hydraulic cylinder and piston to the laser regulated hydraulic system arranged to raise and lower the disk from remote selection controls on the tractor for a desired degree of cut into the soil. Optical signals transmitted by the presetting of the rotating laser are picked up by a receiver associated with the hydraulic system which acts to move a connecting rod of the third link piston to raise and lower the cutting edge of the disk. Thus the cutting action of the disk is adjusted as needed during its travel through a field to establish the grade pre-selected at the laser controls. That is, the laser controls are set for a preselected grade at the laser controls and as the laser rotates it establishes a reference plane extending about the field which the hydraulics-adjusting receiver at the ditcher is arranged to follow as it moves under the reference plane. The cutting disk thus can be raised and lowered incrementally as needed to cut the drainage path to the exact grade selected.

An object of the invention is to provide a ditcher which is readily adjustable in depth of cut and is effective in tossing and distributing soil a considerable distance to one side of the path of drainage being formed.

Another object of the invention is to provide a ditcher which is readily adaptable to being drawn by a conventional tractor.

Still another object of the present invention is to provide a ditcher which is readily controllable to establish pre-selected drainage grades of relatively exacting dimensions.

A feature of the invention is the ready adjustability of the depth of cut and correspondingly the close control of the depth of cut in each increment of travel of the ditcher and formation of a desired drainage path through a field.

Another feature of the invention is that little dust is produced which might otherwise obstruct laser beam controls.

Still another feature is that it produces drainage depressions having rounded out edges in contrast to more conventionally formed right angular walls which wear away more readily and also are not as well suited to allowing planting of crops across the width of the depression formed with the present invention.

A still further feature is that the ditcher cutting action is in a sense a lateral discrete and narrow slicing action which lends itself to small incremental corrective adjustments in comparison to plow-type cutting shoe arrangements less adaptable to depth adjustments within a short length of the depression being formed.

Other objects and features which are believed to be characteristic of my invention are set forth with particularity in the appended claims. My invention, however, both in organization and manner of construction, together with further objects and features thereof may be best understood by reference to the following description taken in connection with the accompanying drawings.

DETAILED DESCRIPTION OF THE DRAWINGS

Figure 1:
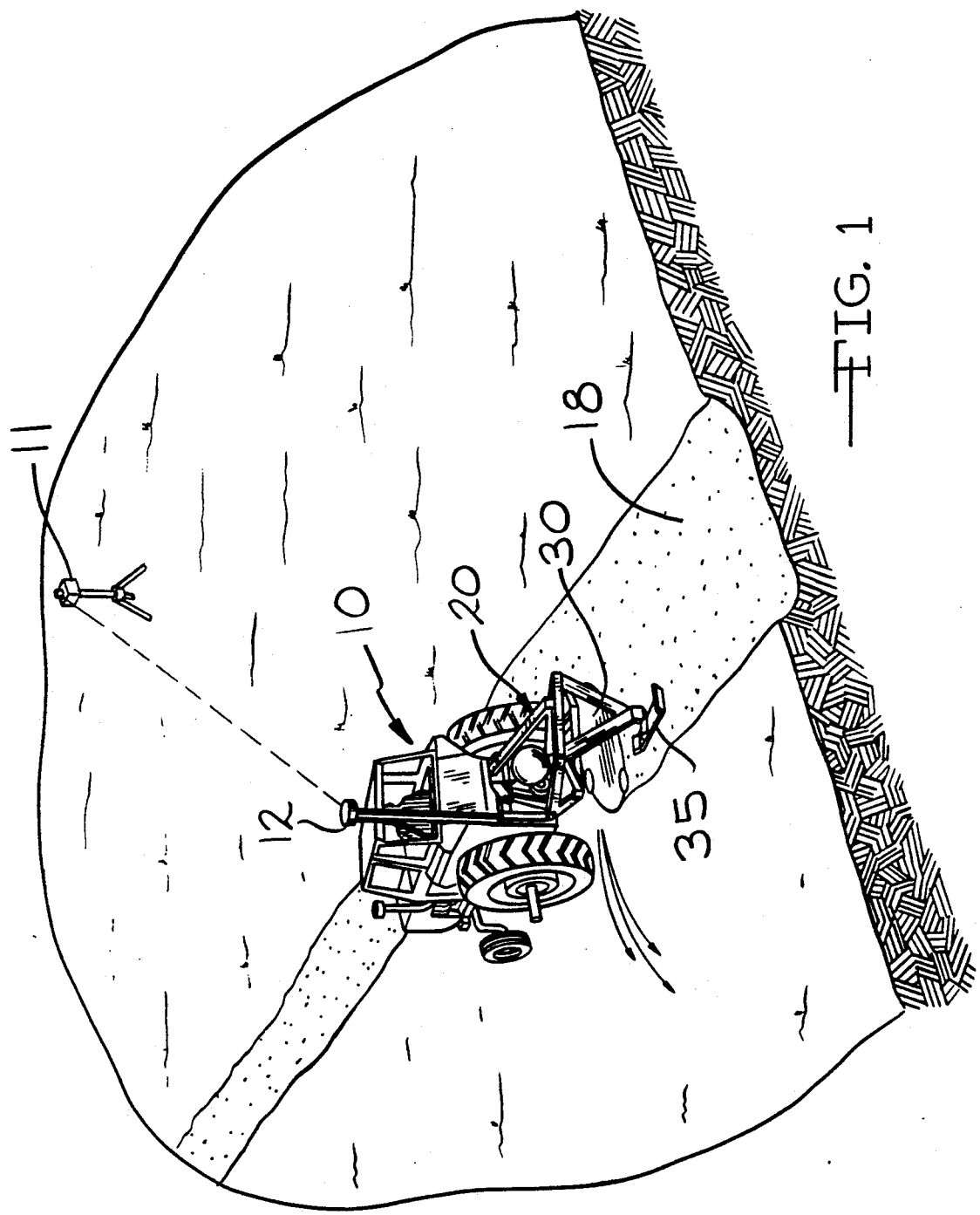
FIG. 1 is a schematic view showing a drainage depression being cut through a field by a tractor drawn ditcher of the present invention in which the depth of cut is regulated by a laser plane transmitter.

In an exemplary embodiment of the invention shown in FIG. 1, the tractor 10 draws a ditcher 20 through a field to form an elongate drainage depression 18. The ditcher has a cutting disk 30 which in a sense leans backward in its line of travel forming a relatively low angle to the ground thereby causing its leading edge to bite in slicing relation into the soil as it is drawn forward by the tractor. Successive slices of soil are thus loosened as they are cut. A stabilizing shoe 35 mounted to contact the ground behind the disk establishes and maintains the depth the depth of cut by the disk into the soil. The ditcher 20 is operated in association with a rotating laser transmitter 11 placed generally in the center of the field in which the system of one or more ditches are being formed. The laser transmitter is positioned at a level high enough in the field such that the beam transmitted thereby will communicate with a receiver 12 placed on a telescopic mast at the front end of the ditcher 20. The receiver on the ditcher is also placed high enough so that it can receive the laser signal without interference from other apparatus or obstacles which may be in the field. The rotating laser beam in a sense forms a plane of laser light which can be set at the laser transmitter to correspond to the grade desired in the drainage depressions. By way of example the laser may be rotated at 600 rpm thereby transmitting to the receiver 10 pulses per second. Adjustment signals are thus provided to the receiver 12 practically constantly to almost instantly correct any deviation from the desired grade as the ditcher is moved through the field.

When a sudden drop off in general terrain is confronted as the ditcher is moved through a field, the laser mast in practice is raised to a level where the disk continues the depth of cut desired. The mast can be thus raised without changing the grade setting at the laser controls. The grade is thereby continued from the lower drop off level. The laser receiver on the telescopic mast can be arranged to be adjusted in height by a hydraulic cylinder connected to hydraulic controls or by an electric motorized screw or more directly by manual adjustment. In raising the laser receiver 12 with a given grade setting, the disk 30 will automatically become adjusted to cut into the soil to the depth desired and the preset grade at the laser controls rather than the disk riding above ground level when the terrain drop off is confronted.

Figure 2:
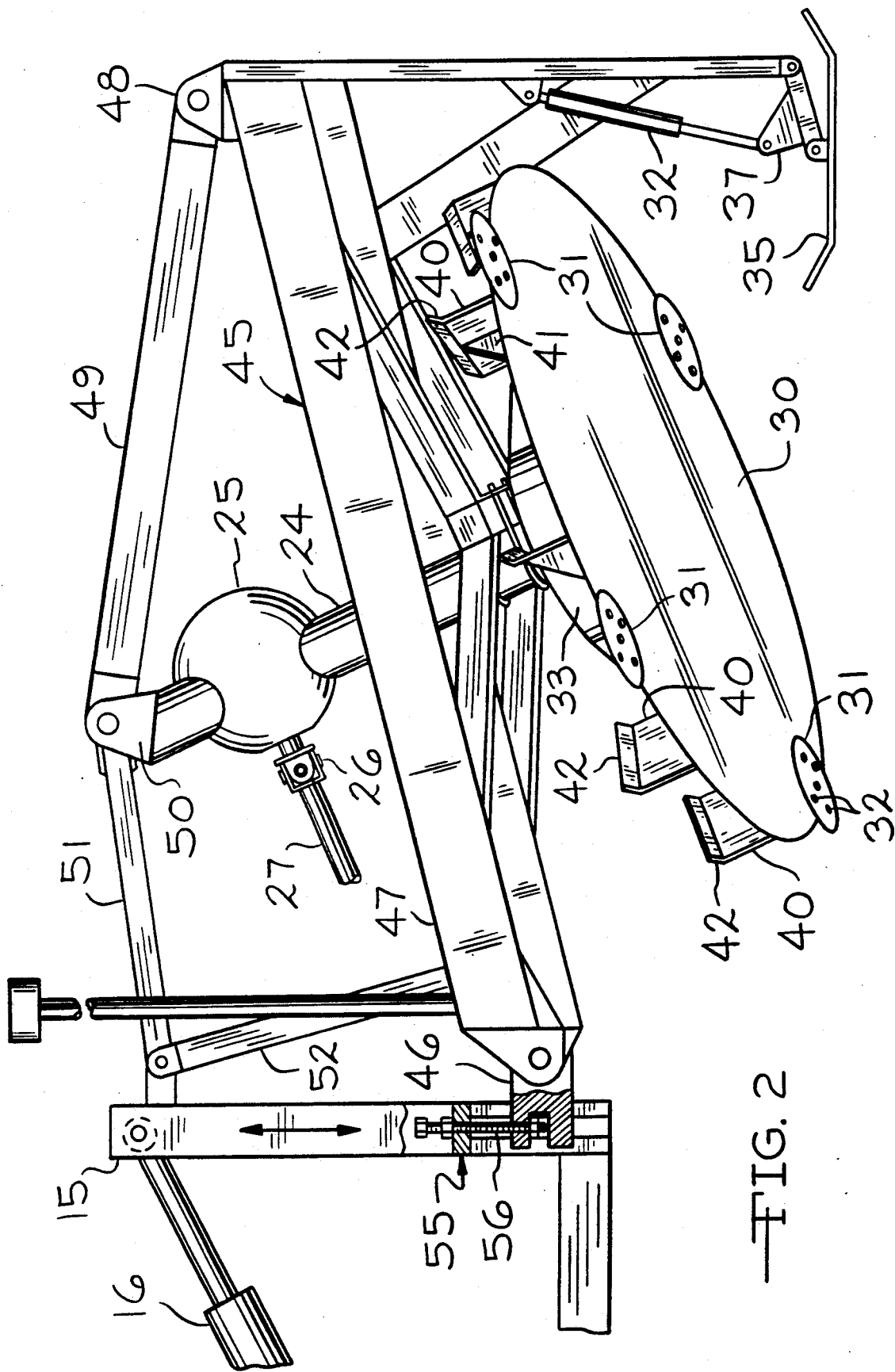
FIG. 2 is a more detailed side elevation partially broken away view of the disk type ditcher of the invention shown in FIG. 1.

In the side elevational view of the ditcher as illustrated in FIG. 2, the cutters 31 are shown in detail to be flat circular plate members mounted on the underface of the cutting disk 30 by way of threaded bolts 32 extending through four of five apertures in each of the circular cutters 31 which secure the circular cutters so that a portion, less than half the cutter circle, projects from the side of the cutting disk. By this arrangement it is possible to remove each of the cutters individually and to rotate it through 90 or 180 degrees as desired to provide a new cutting portion as the projecting portion becomes worn to an undesirably low condition. The life of each circular cutter is thus prolonged, thus reducing the need for maintaining a supply of replacement cutters as changes are needed during operation of the ditcher.

The top surface of the cutting disk 30 has a series of soil gathering paddles or scoops 40 mounted thereon each reinforced by a triangular backing member 41 and having a bent over top scooping edge 42. Each cutter 31 has at least one or more paddles located in trailing relation therewith so that as the cutter loosens the soil to form a drainage depression, each paddle acts to scoop up loosened soil portions on the top face of the disk. As the disk rotates, the paddles convey the soil around and upwardly where centrifical force acting on the soil particles then cause them to be released or thrown laterally outward from the ditcher.

To enhance the soil throwing capability of the rotating disk, the side from which the soil is thrown outwardly is cocked upwardly about a vertical diametric line extending from the leading edge through the disk. The paddles then act to hold the soil an instant longer so that as it is lifted upwardly, centrifical action can be more effective in building up momentum for carriage of the soil over a greater trajectory and distance than is possible without the laterally cocked inclined orientation.

Figure 3:
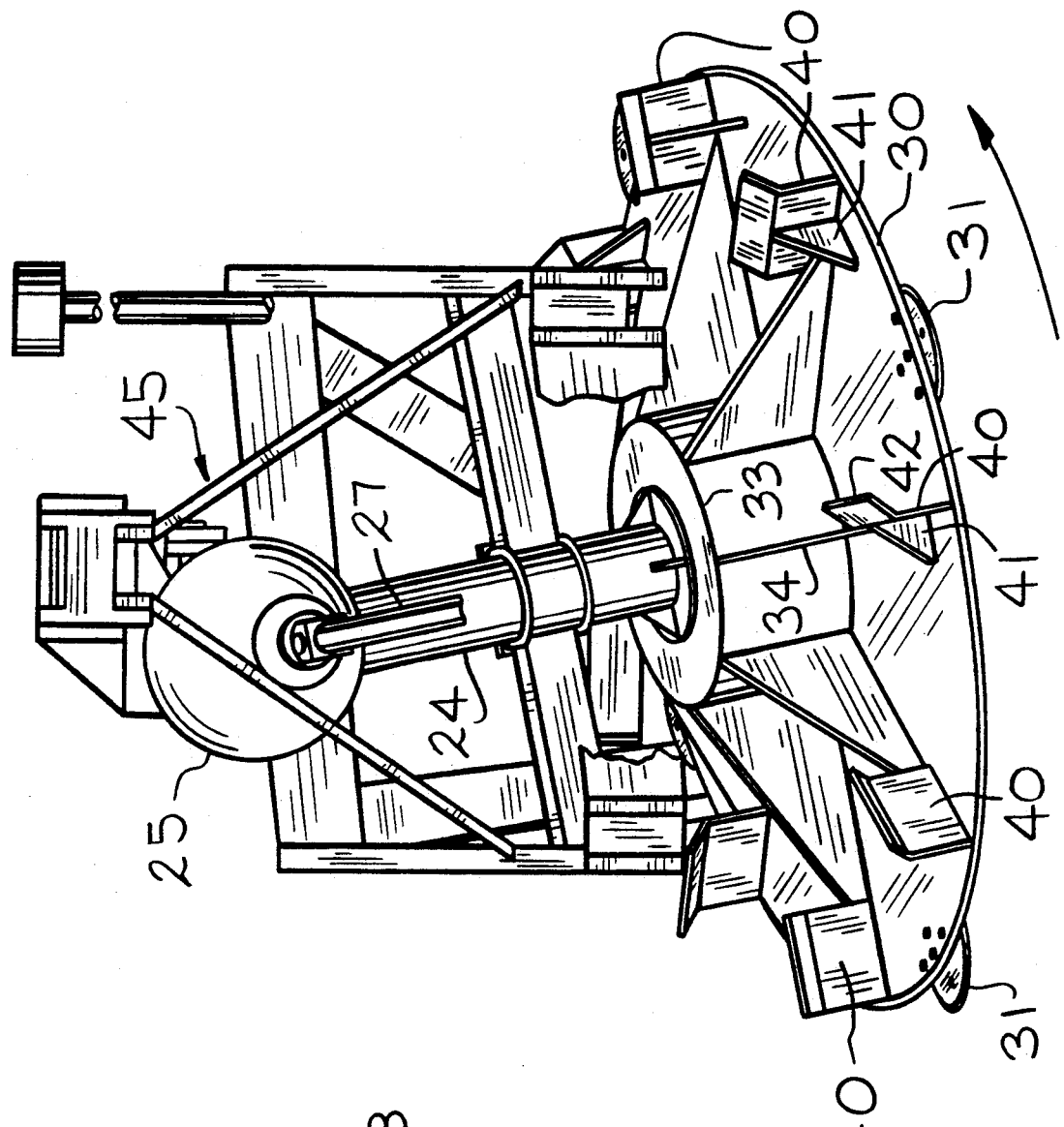
FIG. 3 is a front elevational, partially broken away, view of the ditcher shown in FIG. 2.

FIG. 3 shows a frontal view of the cutting disk assembly illustrating the cocked or laterally inclined relationship of the cutter disk to the horizontal as the ditcher is moved through soil in which a drainage depression is being cut. It can be seen in this illustration that the scooping action includes a lifting of the soil upwardly to a degree before being flung outwardly. Thus a lifting trajectory is imparted to the soil as it is propelled laterally outwardly thereby moving the soil to a much greater distance from its source than would otherwise be attainable without a lateral upward inclination of the disk on its upward moving side during rotation.

FIG. 2 shows more clearly how the cutter disk 30 is driven rotatably by a gear reducer 25 to which rotational power is supplied by a drive shaft 27 extending from a connection with the tractor drive motor not shown. The drive shaft 27 is connected to the gear reducer 25 through a universal joint 26 so that adjustments can be made in the height of the ditcher disk assembly relative to the tractor without affecting the driving action. The disk axle or shaft extending from the gear reducer 25 to the disk 30 resides within a shroud 24 extending to the disk hub 33. As shown the disk viewed from its underside rotates in a clockwise direction while in FIG. 3 in which the disk is viewed from the top its rotation is counterclockwise.

The stabilizing shoe 35 and its adjustable mounting assembly 37 maintain a stable level of the disk in relation to the ground level and also provide means by which the disk cutting edge can be raised and lowered relative to the soil to be cut. The shoe 35 is adjustable in height by way of its support assembly 37 and a piston and cylinder unit 36 hydraulically controlled so that as the unit expands the disk 30 is lifted and as it contracts the disk is lowered toward and into the soil to be cut. Representative dimensions of the stabilizing shoe 35 are 10 inches in width and a length of 24 inches. The front and rear ends of the shoe are both bent upwardly at about 30 degrees to prevent the shoe from digging into the ground while the tractor 10 moves either forward or backward.

The disk and shoe arrangement are mounted near the end of an adjustable frame 45 supported on a tractor tow bar 15 which can be conventionally lifted and lowered by hydraulic mechanism not shown, or tilted downwardly by a hydraulic piston cylinder unit 16. Thus once the desired relationship between the shoe 35 and the cutting edge of the disk 30 is established, the ditcher can be lifted or lowered by the tractor at its tow bar 15 or where the angle of bite of the disk is to be modified in relation to the horizontal the tow bar assembly can be tilted downwardly to establish the desired relationship of the disk to horizontal where on site tests indicate that certain specific angles are preferable for cutting action in the soil confronted.

The disk support frame 45 includes a pair of opposite side link bar members 47 which have their ends pivoted at a support 46 at the base of the tow bar 15. These two members, spaced apart at their bottom end, extend upwardly toward each other to a pivot 48 toward the rear end of the ditcher at the top of a downwardly extending support member for the stabilizer shoe 35. A third link 49 extends between a pivot support 50 at the top of the gear reducer 25 to the pivot member 48 at which the two side links 47 extend and are joined at the pivot member 48. A longitudinal correcting member 51 fastened in pivoted relation at one end to the tow bar 15 extends to and is pivoted at the pivot support member 50 and acts to hold the support frame 45 in its cantilevered relation at the disk angle desired. The member 51 pivoted at both ends is further supported or reinforced by a member 52 pivotally connected thereto and extending up from the framework near the bottom of the tow bar 15. Thus as the hydraulic unit 16 expands and contracts it can tilt the cantilever supported framework 45 about the pivot 46 at the base of the tow bar. Correspondingly the hydraulic piston unit 36 can be adjusted to lift or lower the shoe 35 in matching relationship to the tow bar support to fix the angle and bite of the disk 30 relative to ground level.

The disk 30 is arranged to be inclined upward at its side toward which it rotates to establish the desired lateral angle of throw. The disk side is adjusted in lateral angle by way of a manual turnbuckle assembly 55 provided on one or both sides of the tow bar 15. The link bar member 47 and the side of the disk can be adjusted in vertical position by the threaded turnbuckle bolt 56 connected to the pivot support 46. Such an adjustment assembly 55 can be provided on both sides of the two bar 15, but one such adjustment assembly on one use is found to be capable of providing the angular degree of inclination desired.

Alternate to such manual turnbuckle adjustment mechanism, a hydraulic piston and cylinder unit can be utilized to provide the adjustment capability desired while the ditcher is in operation. Although a specific frame support arrangements and adjustment are thus described it will be understood that any one of a number of frame arrangements can be provided to establish the suspension relation of the cutting disk and its drive for adjustment to the desired disk angles relative to ground.

By way of example of specifications for the ditcher disclosed herein without intention to be limited thereto, the speed reducer 25 for driving the cutting disk may have a 5 to 1 reduction ratio to drive the disk 30 at rotational speeds of 125 to 250 RPM with a normal operation running speed of about 200 RPM. The disk itself can have a diameter in a range of 4 to 6 feet with a 5 foot diameter having been found quite successful in operation. The four circular cutters 31 are made of hard steel to withstand rugged cutting action and are secured in outward projecting relation to the large disk 30 at 90 degree spacing about the disk. The cutters 31 may have a dimension in the order of 10 inches in diameter and be arranged to project from the edge of the disk 30 in the order of about 3 inches. Additional cutters spaced about the disk may also be provided as found desirable.

The angular orientation of the cutting disk 30 extending from its leading cutting edge is found to be desirably in the range of 15 to 30 degrees with a 23 degree angle to horizontal ground being found by operational tests to perform best for general use. The laterally inclined orientation of the plane of disk 30 relative to ground level, such as when viewed frontally as in FIG. 3 is found by test to function best in throwing capability which in a range from 10 to 30 degrees upward on the upward moving side of rotation. Dependant upon the soil being cut and thrown it is found that a 20 degree lateral inclination functions quite satisfactorily in general use. The paddle type scoops 40 mounted on the front side of the cutting disk 30 function well with dimensions of 12 inches wide and 9 inches high with a 45 degree bent over top end section of 3" dimension. One or two or more scoops 40 can be provided behind each cutter 31 as found desirable but only one behind each cutter has been found to work well.

A disk type ditcher of this invention with these specifications it is found can readily make a drainage depression about 8 to 10 inches deep and 3 to 4 feet in width at a travel speed of about 5 mph. The soil thrown outwardly by the disk can reach distances of 60 to 80 feet. At a slower rotational speed for the disk such as at 150 RPM, the amount of power and cutting force required is relatively high and the distance of deposition is less, such as in the order of 50 feet. If the speed is about 250 RPM, the throw can be in the order of 80 feet. Larger chunks of soil are found to be thrown out the furthest while finer soil particles are deposited closer to the furrows being formed.

Although the ditcher as described herein as an attachment mechanism to a tractor, it will be recognized by those versed in the art that the assembly of this invention can be provided with its own drive power and adjustment capability to permit its self-propelled operation independently of a tractor. In this regard it will be understood that in view of the foregoing that a number of variations of the arrangement of my invention can be provided within the broad scope of principles embodied therein. Thus, while a particular preferred embodiment of my invention has been shown and described herein, it is intended by the appended claims to cover all such modifications which fall within the true spirit and scope of the invention.

I claim:

1. A ditcher assembly for forming longitudinal soil depressions comprising
   a prime mover for moving said assembly in a line of travel corresponding to the longitudinal depression desired,
   a rotary ground cutting disk mounted in said assembly,
   said disk having a planar orientation generally transverse to said line of travel and leaning opposite to the forward direction of travel of said assembly such that the under face of said disk forms an acute angle with the ground to be cut,
   the lower edge of said inclined disk providing the leading cutting edge of said disk,
   power supply means for rotationally driving said cutting disk,
   means for selectively setting the depth of said disk relative to ground to establish a cutting action into the soil at said leading edge,
   at least one cutter at the edge of said disk arranged to cut into and loosen the ground with each rotation of said disk, and
   means on said disk for throwing the cut soil to one side of the line of travel of said assembly.

2. A ditcher assembly as set forth in claim 1 wherein said cutters project from the side of said disk.

3. A ditcher assembly as set forth in claim 2 wherein said cutters comprise more than one cutter spaced equidistantly about said disk.

4. A ditcher assembly as set forth in claim 3 wherein said cutters comprise flat plate members secured flatly to the under face of said disk.

5. A ditcher assembly as set forth in claim 4 wherein said cutters are circular plate members set with a cutting portion projecting from the edge of said disk.

6. A ditcher assembly as set forth in claim 5 wherein said circular cutters can be selectively rotated to a new projecting setting as the projecting portion of each becomes undesirably worn in use.

7. A ditcher assembly as set forth in claim 1 wherein said disk forms a front to back angle with the ground in a range from 15 to 30 degrees horizontal to the ground.

8. A ditcher assembly as set forth in claim 7 wherein said disk forms an angle of about 23 degrees with the ground.

9. A ditcher assembly as set forth in claim 1 in which said means for throwing the cut ground comprises at least one scooping paddle member provided on the upper and leading face side of said disk in trailing relation behind a cutter.

10. A ditcher assembly as set forth in claim 1 wherein the general plane of said disk has a lateral orientation inclined upwardly on the side of said disk which moves upward during rotation.

11. A ditcher assembly as set forth in claim 10 wherein the upward angle of inclination of said side of the disk is in the range of 10 to 30 degrees to the horizontal.

12. A ditcher assembly as set forth in claim 11 wherein the lateral angle of inclination of said disk is about 20 degrees.

13. A ditcher assembly as set forth in claim 1 wherein stabilizing means of said assembly extends downwardly into contact with the ground in trailing relation behind said disk maintains said disk during rotation in stable selected depth relation with the ground as said ditcher moves forward in said line of travel.

14. A ditcher as set forth in claim 13 wherein said stabilizing means comprises a slidable shoe supported on an extension adjustable in length whereby said assembly can be raised and lowered to adjust the depth of cut of said disk.

15. A ditcher assembly as set forth in claim 14 in which said prime mover is a tractor on the rear of which said assembly is mounted and to which mechanical driving connection is provided as said power supply means for driving said cutting disk.

16. A ditcher assembly as set forth in claim 15 in which the assembly is adjustable in height at the rear of said tractor to provide a desired depth of cut by said disk with the underlying ground.

17. A ditcher assembly as set forth in claim 16 in which the adjustments in height of said disk is accomplishable by remotely controllable hydraulic means.

18. A ditcher assembly as set forth in claim 17 wherein rotating laser plane controls with grade selection means is provided with a receiver on said ditcher assembly in interconnected relation with said hydraulic means whereby adjustments in height of said cutting disk are made progressively according to a preselected grade as said ditcher travels over soil in which a longitudinal depression is being formed.

19. A ditcher assembly for forming longitudinal soil depressions comprising
   an assembly supporting a rotatable soil cutting disk having at least one cutter projecting from its edge,
   a prime mover for moving said assembly in a line of travel over soil corresponding to the longitudinal depression desired,
   said cutter disk being supported by said assembly for rotation in a plane generally transverse to the direction of travel of said assembly in forming a longitudinal depression, said plane of rotation of said disk being oriented in leaning relation opposite to the forward direction of travel of said assembly such that the underface of said disk forms an acute angle with the ground to be cut, the lower edge of said inclined disk providing the leading cutting edge of said disk, means for selectively setting the depth of said disk relative to ground to establish a cutting action into the soil at said leading edge, connection means provided connecting said prime mover and said disk for supply of rotational driving power to said cutting disk, means on said disk for collecting and throwing the soil cut by said disk to one side of the line of travel of said assembly, and means extending from said assembly positioned to trail said disk in contact with the cut ground to stabilize the depth of cut of said disk.

20. A ditcher assembly as set forth in claim 19 in which said disk can be adjustably tilted laterally upward on the side of said disk which moves upward during rotation to establish a desired degree of throw of the soil cut by said disk.

21. A ditcher assembly as set forth in claim 20 in which adjustment of the lateral tilt of said disk can be accomplished by remote control means.

22. A method of forming longitudinal soil depressions comprising rotating a cutting disk having a soil cutting edge in a depression being formed and in communication with the soil being cut, tilting the plane of rotation of said disk to the rear of the depression being formed to effect a biting of the edge of the cutting disk to a preselected depth into the soil being cut, progressively advancing the transversely rotating disk into uncut soil to cut successive slices of soil to be removed to form the desired longitudinal depression, removing the cut soil with scoops associated with the rotating disk, and throwing the scooped soil laterally to one side of the depression being formed.

23. The method of claim 21 in which the disk is tilted upward a selected amount on the upward moving side of said rotating disk to establish a desired lateral trajectory of the soil thrown to the side of the depression being formed.

24. The method of claim 23 in which the preselected depth of cut by said disk is modified progressively according to a preselected grade desired as the rotating disk is advanced in forming the desired longitudinal depression.

* * * * *